(No Model.)
L. MARCHESE.
ROACH TRAP.
No. 544,183. Patented Aug. 6, 1895.
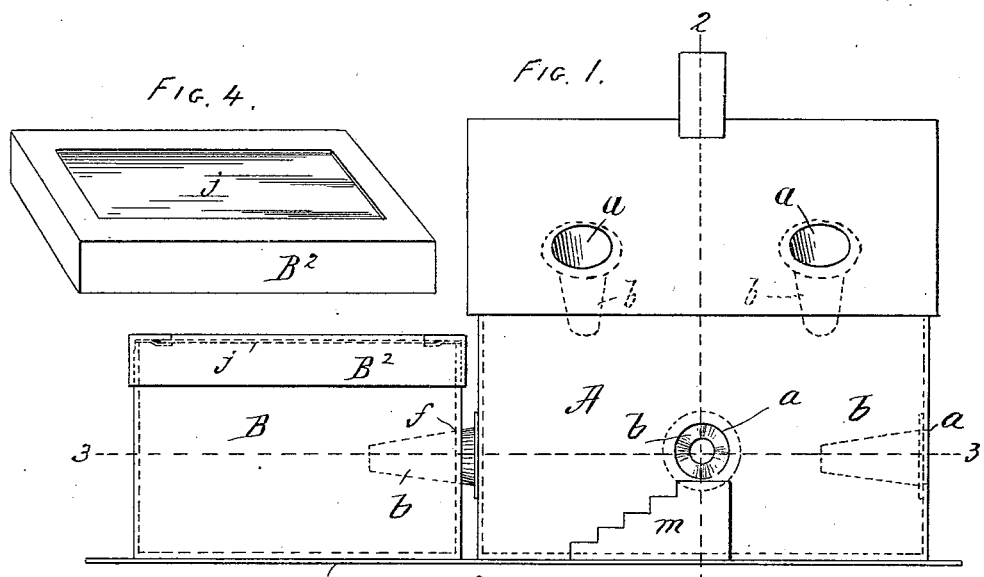
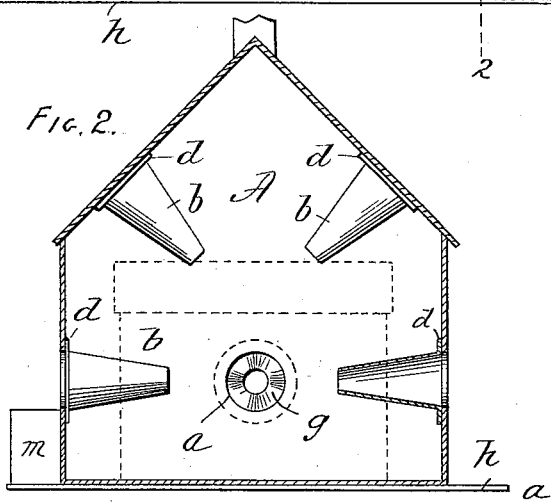
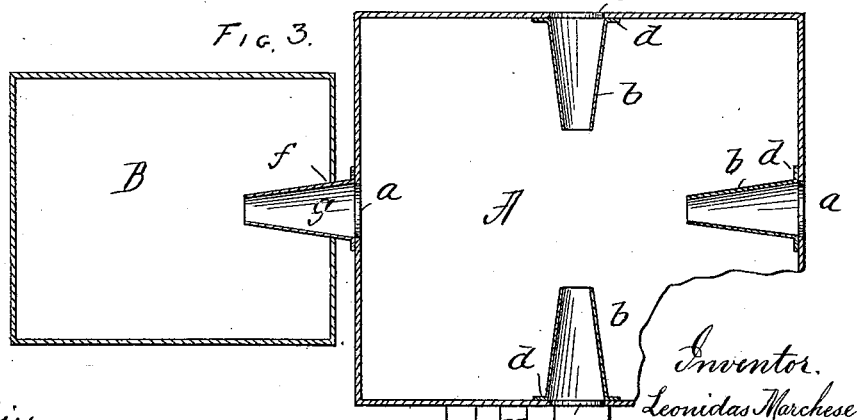
Witnesses
Wm H Chapin
K. S. Clemons
Inventor
Leonidas Marchese
By Chapin & Co.
Attys.

UNITED STATES PATENT OFFICE.

LEONIDAS MARCHESE, OF SPRINGFIELD, MASSACHUSETTS.

ROACH-TRAP.

SPECIFICATION forming part of Letters Patent No. 544,183, dated August 6, 1895.

Application filed March 23, 1895. Serial No. 542,993. (No model.)

*To all whom it may concern:*

Be it known that I, LEONIDAS MARCHESE, a citizen of the United States of America, residing at Springfield, in the county of Hampden and State of Massachusetts, have invented new and useful Improvements in Roach-Traps, of which the following is a specification.

This invention relates to improvements in roach-traps, the object thereof being to improve the construction of this class of appliances, to the end of obtaining greater certainty in the catching, retention, and destruction of the vermin than has been heretofore derived in devices of this character.

The invention consists in constructions and combinations of parts, all substantially as will hereinafter fully appear, and be set forth in the claims.

Reference is to be had to the accompanying drawings, in which the new trap is illustrated, and in which—

Figure 1 is a side elevation of the trap. Fig. 2 is a cross-section on line 2 2, Fig. 1. Fig. 3 is a horizontal section on the line 3 3, Fig. 1. Fig. 4 is a perspective view of the cover for the supplemental chamber.

In the drawings, A represents the main chamber of the trap, which consists of a closed box with, however, the perforations $a$ through its sides intermediate between the top and bottom, at several of which there are mounted the inwardly-extending hollow cones $b$, the same being preferably composed of sized cloth or muslin and formed with the flanges $d$, surrounding the base, by means of which they are glued or otherwise attached to the walls of the chamber surrounding the openings $a$. A secondary chamber $b$ is provided, the same consisting of a box having a perforation $f$ through its one side or end, and it also has a removable cover B² preferably with a transparent top $j$.

A cone $g$ is provided at one of the perforations in one wall of the chamber A, being supported externally on said wall and protruding with a close fit through and beyond the perforation $f$ in the secondary chamber. The main chamber A has at its base, to which it is secured, a sheet $h$, of cardboard or other semi-rigid or suitable material, which forms a bottom for the main chamber A and a support for the secondary one B. This base projects beyond the sides and ends of the chamber A, so as to form supports for the stairs, as well as the secondary chamber B, thus enabling the entire trap to be carried around at will. These stairs being about as wide as the projecting edges of the base, the roaches in crawling around the bottom of the chamber and attempting to climb over the stairs are brought directly to the mouths of the entrances and so pass directly in. Only one stair is here shown, but there will in practice be one for each entrance through the sides. Should it be desired at any time to make doubly sure of preventing any of the roaches from escaping by the side entrances, they may be closed up, and then the roaches and bugs will enter by the inclined tapering tubes $b$, which extend inwardly and downwardly from the roof. These tubes being placed at an angle the roaches cannot escape through their contracted inner ends.

It has been found in this class of traps that the roaches entering a box in which they may be induced to go on finding an exterminator therein will avoid it and escape through the conical passages through which they came.

In this present trap it is the purpose to provide merely an attractive bait in the main chamber and a deadly exterminator in the secondary chamber and to provide an exit from the main to the secondary chamber, which is the larger, where it communicates with the main chamber, whereby the roaches will follow this in preference to attempting the more difficult exit through any of the passages of entrance, and hence they will be brought into the death-chamber, which is lighted, and constitutes an additional inducement for the vermin to go that way in preference to attempting to escape to the exterior of the trap.

The trap is shown as gotten up in the form of a house, the death-chamber constituting the L, and a flight of steps is provided, as seen at $m$, leading to one of the entrance-passages, although of course the style of the trap may be widely varied; and I am, of course, aware that roach-traps embodying a box or chamber with in-leading passages of conical form and provided with a removable cover are not new, and such I do not claim, the essential feature of my invention being the combination, with the main chamber having conical passages leading thereinto, of a secondary chamber, preferably with a transparent cover, with a conical passage leading from the main chamber into the secondary one, the secondary chamber, moreover, having, preferably, a removable connection with this latter passage, whereby it may be emptied of the vermin without necessarily moving the main chamber.

Having thus described my invention, what I claim, and desire to secure by Letters Patent, is—

1. In an insect trap, the main chamber provided with a roof having slanting sides, combined with tubular conical entrances through both the sides and roof, those entrances through the sides being adapted to be closed so as to shut off all escape for the trapped insects, substantially as described.

2. In an insect trap, the main chamber A, having a slanting roof, tubular conical entrances through both roof and sides, and a tubular conical exit, combined with the base which projects beyond the main chamber on all sides, the stairs, and the chamber B having a removable transparent cover; the chamber B and stairs being supported upon the projecting portions of the base, substantially as set forth.

LEONIDAS MARCHESE.

Witnesses:
WM. S. BELLOWS,
J. D. GARFIELD.